US007341368B2

(12) United States Patent
Bariller et al.

(10) Patent No.: US 7,341,368 B2
(45) Date of Patent: Mar. 11, 2008

(54) HEADLIGHT APPARATUS WITH AN OCCULTING ELEMENT HAVING AN INTEGRAL FASTENING SYSTEM, AND A METHOD OF FASTENING AN OCCULTING ELEMENT IN A HEADLIGHT APPARATUS

(75) Inventors: Florian Bariller, Bobigny (FR); Julien Cesaire, Bobigny (FR)

(73) Assignee: Valeo Vision, Bobigny Cedex (FR)

( * ) Notice: Subject to any disclaimer, the term of this patent is extended or adjusted under 35 U.S.C. 154(b) by 0 days.

(21) Appl. No.: 11/270,384

(22) Filed: Nov. 8, 2005

(65) Prior Publication Data

US 2006/0098449 A1 May 11, 2006

(30) Foreign Application Priority Data

Nov. 9, 2004 (FR) .................................. 04 11948

(51) Int. Cl.
*B60Q 1/02* (2006.01)

(52) U.S. Cl. ....................... 362/539; 362/304; 362/353

(58) Field of Classification Search ................ 362/539, 362/507, 357, 509, 353, 361, 304, 305, 433, 362/448

See application file for complete search history.

(56) References Cited

U.S. PATENT DOCUMENTS 4,747,029 A * 5/1988 Liverance et al. .......... 362/548
4,822,302 A * 4/1989 Dorleans .................... 439/544
4,882,660 A * 11/1989 Liverance et al. .......... 362/549

* cited by examiner

*Primary Examiner*—Alan Cariaso
*Assistant Examiner*—Leah S. Lovell
(74) *Attorney, Agent, or Firm*—Morgan & Finnegan, LLP

(57) ABSTRACT

The present invention relates to a headlight apparatus in which fastening of an occulter is independent from the fastening of a light source. To this end, the headlight apparatus includes an occulter with an occulting portion which is fitted in a reflector, the occulting portion being extended in length by a central portion which is terminated by a retaining foot held in a housing formed on an outer face of the reflector, at the level of an aperture formed in the body of the reflector, by mechanical pressure exerted between the walls of the housing and the retaining foot. Preferably, the retaining foot consists of a first tongue which is used as a locking key, and a second tongue which includes, in particular, a locking slot for receiving the locking key whereby to spread the retaining foot laterally.

15 Claims, 3 Drawing Sheets

HEADLIGHT APPARATUS WITH AN OCCULTING ELEMENT HAVING AN INTEGRAL FASTENING SYSTEM, AND A METHOD OF FASTENING AN OCCULTING ELEMENT IN A HEADLIGHT APPARATUS

TECHNICAL FIELD OF THE INVENTION

The present invention relates to a headlight apparatus that includes an occulting element with an integrated fastening system, and a method of fastening the said occulting element within a headlight apparatus.

The essential object of the invention is to propose a solution whereby the operation of putting an occulting element, which is traditionally referred to as occulter, in place within the headlight apparatus, is independent from the operation of putting the light source of the headlight apparatus concerned in position. In addition, the object of the invention is achieved by simplifying the positioning of such occulter, in particular by not making use of either an intermediate fastening member of the crown type screwed on the reflector, or any fastening means of the screw type.

The field of the invention is, in general terms, that of motor vehicle headlights. Various types of headlights are known in this field, among which are essentially the following:

- position lights, of low intensity and low range;
- passing lights, or dipped headlights, having a higher intensity and a range of about 70 meters along the road;
- long range cruising lights, and complementary lights of a long range type, giving a visible zone of about 200 meters along the road;
- improved headlights, which may be called dual function lights, which combine the functions of passing lights and cruising lights by incorporating a removable mask;
- fog lights;
- indicating or signaling lights, and so on.

In the field of headlight apparatus, there are two main families of such apparatus which correspond to two distinct arrangements of elements within the headlights.

The first family is that which consists of so-called parabolic headlights. In this type of light, a light beam is generated by a light source of small size disposed in a reflector or mirror. Projection on the road of the light rays which are reflected by an appropriate reflector enables a light beam to be obtained directly which obeys the various requirements imposed by regulations. Such a headlight apparatus may optionally be completed by an exit surface of the glass type, which may for example be formed with ridges in order to modify the light beam, for example by spreading its width. The second family is that which consists of so-called elliptical headlights. In this family of headlights, a patch of concentrated light is generated by a light source disposed in a reflector. The patch of concentrated light is then projected on the road by a convergent lens, for example a lens of the planar-convex type. The present invention is applicable to both the families just mentioned. In general terms, the invention may be used in any headlight apparatus having a light source which emits light signals where at least part of the light signal has to be occulted.

TECHNOLOGICAL BACKGROUND OF THE INVENTION

In the state of the art, headlight apparatus is known in particular, in which, within the headlight apparatus concerned the occulter is seamed on a crown piece which is screwed on a reflector, the latter being made for example in a thermosetting material and the crown also acting to hold the light source through a spring. It is also known to provide headlight apparatus in which the occulter is fixed by means of a screw on the thermosetting reflector. In this type of solution, fastening of the occulter is still dependent on the fastening of the light source. In addition, in the known solutions, the physical size of the intermediate fastening members makes it obligatory to fit the occulter through the back of the reflector, which adds fitting constraints that can prove detrimental in terms of simplicity and speed of the process of manufacturing the headlight apparatus concerned.

It is also known, from the document U.S. Pat. No. 6,203,177, to provide a headlight apparatus which includes an occulter, the foot of which includes enlarged portions which are force-fitted into the grooves in an insertion hole, and which are held in the latter elastically, while it is known from the document EP-0 900 973 to provide a headlight apparatus having an occulter the foot of which includes a finger which holds the foot elastically in the aperture of the reflector.

The solutions regarding the fitting of an occulter in place in a headlight apparatus, which are envisaged in the state of the art, are accordingly not satisfactory; in addition, some motor equipment manufacturers tend, for reasons of reliability, to propose solutions to maintain the light source within a headlight apparatus by omitting the screwing-up operations. In this context, it is burdensome that the fastening of the light source depends on fastening of the occulter.

GENERAL DESCRIPTION OF THE INVENTION

The object of the invention proposes a solution to the problems and drawbacks which have been discussed above. In general terms, the invention proposes a solution in which fastening of the light source is independent of the fastening of the occulter. The two functions—that is to say fastening of the lamp and fastening of the occulter—are thus quite separate, leaving greater scope for proposing satisfactory solutions for holding the light source in place within a reflector. More particularly, the present invention proposes headlight apparatus, and an associated fastening method, in which the occulter is held without any intermediate element that would intervene in the holding of the light source. The occulter also includes a retaining foot which constitutes an integral fastening means.

To this end, the invention proposes, essentially, headlight apparatus for a motor vehicle that comprises, in particular:

- a light source;
- a reflector element within which the light source is disposed, the said reflector being of curved form terminated by a body in which an orifice is formed; and
- an occulting element that comprises an occulting portion located within the reflector for intercepting light signals emitted by the light source, the occulting portion being extended in length by a central portion terminated by a retaining foot, the said retaining foot being held, in a housing formed on an outer face of the reflector at the level of the aperture, by mechanical pressure exerted between walls of the housing and the retaining foot, wherein the retaining foot of the occulting element comprises a first tongue which is used as a locking key, and a second foot which includes, in particular, a locking slot for receiving the locking key.

The headlight apparatus according to the invention may include, besides the main features just set forth in the last preceding paragraph, one or more additional features, among which are the following:

the occulting element is a monobloc component;

the aperture is of circular form completed by a slot, the housing being formed facing the slot;

the housing includes a lower portion having an aperture through which the central portion of the occulting element extends;

the second tongue is terminated by at least one fastening lug, each fastening lug being bent back on a lower face of the housing, which prolongs an inner face of the reflector, whereby to secure the occulting element against axial movement on the reflector;

the second fastening tongue is terminated by a first fastening lug and a second fastening lug;

the first fastening lug and second fastening lug are disposed on either side of the central portion of the occulting element, the first fastening lug and second fastening lug meeting together at the level of a base portion of the second fastening tongue, which is placed in abutment against a flat portion of the second tongue whereby to maintain the locking key in a horizontal position;

the occulting element is made from ALUSI (Registered Trade Mark);

the central portion of the occulting element comprises a first flank and a second flank, at least one of the flanks having a return portion for stiffening the said central portion;

the first flank and second flank are secured together by fastening means.

The invention also relates to a motor vehicle equipped with a headlight apparatus including the main features, optionally completed by one or more of the additional features which have just been set forth.

The present invention further provides a method of fastening an occulting element on a headlight apparatus, the said headlight comprising, in particular, a light source and a reflector element within which the light source is disposed, the said reflector being of curved form terminated by a body, with an aperture being formed at the level of the body, wherein the method comprises the various steps consisting of:

forming, on an outer face of the reflector at the level of the aperture, a housing for receiving the occulting element;

installing the occulting element, comprising an occulting portion extended in length by a central portion, which is terminated by a retaining foot, within the headlight apparatus, by keeping the retaining foot in the said housing, with mechanical pressure exerted between the walls of the housing and the retaining foot preventing movement of the occulting element.

The method according to the invention may, besides the main features just set forth in the immediately preceding paragraph, include one or more additional features, among which are the following:

the method includes the additional step, during the step of installing the occulting element, of inserting a locking key into a locking slot, so as to cause the retaining foot to spread laterally whereby to provide the mechanical pressure between the walls of the housing and the retaining foot, the retaining foot consisting of a first tongue defining the locking key, and a second tongue which comprises, in particular, the locking slot into which the locking key is inserted;

the method includes the step, in the course of the step of inserting the locking key into the locking slot, of bending back at least one fastening lug situated at one end of the second tongue, on a lower face of the housing which extends in length an inner face of the reflector, whereby to prevent axial movement of the occulting element;

the method includes, before the step of installing the occulting element within the headlight apparatus, the step that consists of positioning the retaining foot in facing relationship with the housing, by passing the retaining foot through the aperture formed in the body of the reflector; and the method includes, before the step of installing the occulting element in the headlight apparatus, the step that consists of positioning the retaining foot in facing relationship with the housing by passing the occulting portion through the aperture formed in the body of the reflector.

The invention and its various applications will be understood more clearly on a reading of the following description, with a study of the drawings by which it is accompanied.

BRIEF DESCRIPTION OF THE DRAWINGS

These are presented by way of example only and are in no way limiting of the invention.

The drawings are as follows.

DESCRIPTION OF PREFERRED EMBODIMENTS OF THE INVENTION

Figure 1:
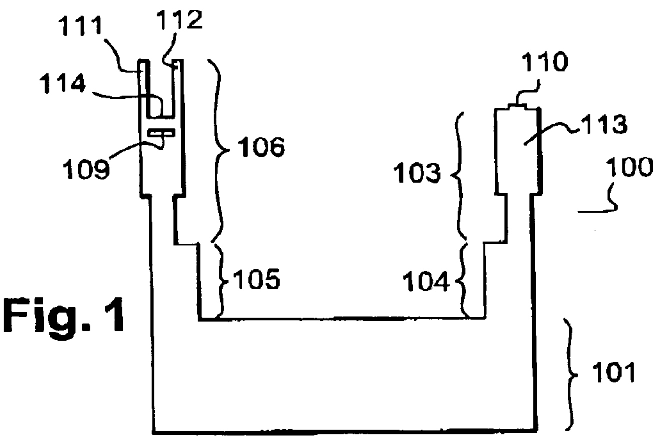
FIG. 1 is a representation in one plane of an example of an occulting element used in the performance of the invention.

The various elements which appear on more than one Figure of the drawings will be given the same reference numerals except where stated otherwise.

FIG. 1 shows a view of an occulting element 100, or occulter, in the flat. This occulter is adapted to be used in a headlight apparatus according to the invention. The occulter 100 is preferably in the form of a component made in one piece in a single material, for example stainless steel, a malleable material, or ALUSI (Registered Trade Mark); this latter material consists of layers of aluminum and mild steel laminated together and has thermal characteristics which are particularly well adapted to its use in motor vehicle headlight apparatus. The occulter 100 can accordingly be made in a simple way by pressing it out from sheets of a material, and then bending it to give it its definitive form shown in FIG. 2. In the example shown, no molding, and no assembly operation of different components, is necessary in order to produce the occulter 100

The occulter 100 consists in particular of an occulting portion 101, the flattened form of which is approximately rectangular; after bending of the occulter 100, the occulting portion 101 is in the form of a cylinder or a cone which, put into an appropriate position within a headlight apparatus, enables some light signals which are of no use to the function of the headlight, to be intercepted. Where the bent occulting portion 101 is conical, its flattened form is not strictly rectangular but is slightly trapezoidal. The occulting portion 101 is extended in length by a central portion 102 which is formed by juxtaposition of a first flank 104 with a second flank 105 extending on either side of—and approximately at right angles to—a common side which delineates a length of the rectangle that defines the occulting portion 101 in its flattened form. The juxtaposition of the flanks 104 and 105 may be completed by a means for fastening the said flanks together to complete their association. At least one of the flanks 104, 105 has a return portion 107 which defines a right angle with the associated flank, and is such as to stiffen the central portion 102. The return portion 107 is made by bending the first flank 104 and/or the second flank 105.

Figure 3:
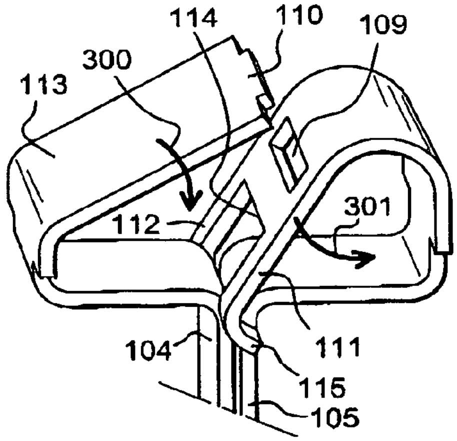
FIG. 3 is a detailed representation of the retaining foot of the occulting element of FIGS. 1 and 2.
Figure 4:
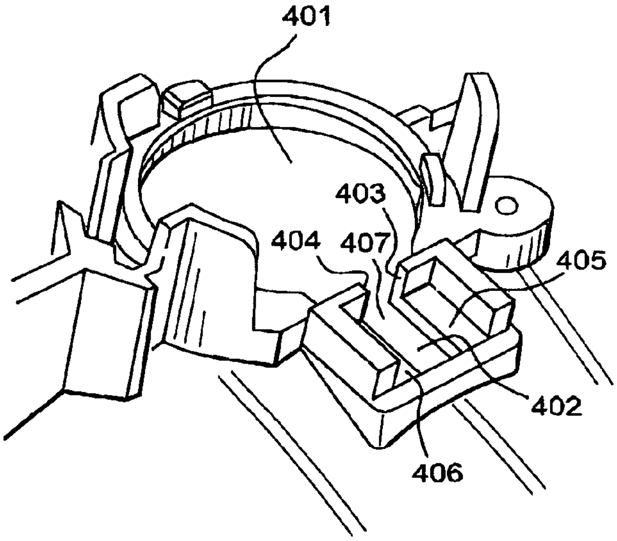
FIG. 4 is a first view of a housing formed in a reflector for receiving the occulting element shown in the foregoing Figures.
Figure 5:
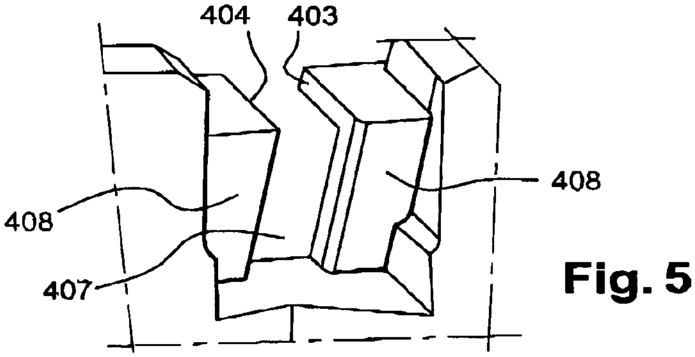
FIG. 5 is a second view showing the housing of FIG. 4.

The first flank 104 and second flank 105 are extended in length by a first tongue 103 and a second tongue 106 respectively, which are brought together by bending the occulter 100 so as to form a retaining foot 108 of the occulter. The first tongue 103 supports a locking key 113, the purpose of which will be described later herein. The second tongue 106 has a locking slot 109 which is designed to receive a nose 110 disposed at one end of the locking key 113, and the second tongue 106 terminates in a first fastening lug 111 and a second fastening lug 112, which are parallel to each other and are of identical dimensions. The fastening lugs 111 and 112 have, in particular, end portions 115 which are arranged to be bent over as shown in FIG. 3. The first fastening lug 111 and second fastening lug 112 are joined together by a base portion 114 of the second fastening tongue 106, the said base portion serving to support the fastening lugs.

Figure 2:
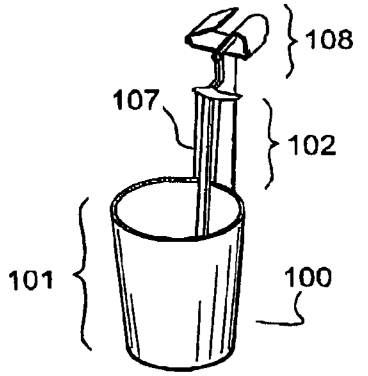
FIG. 2 is a diagrammatic representation of the occulting element of FIG. 1, after being bent once.

The occulter 100 shown in FIG. 1 is, as has already been mentioned, arranged to be reformed by bending so as to adopt a three-dimensional form shown in FIG. 2. For this purpose, a certain number of grooves may for example be formed on the occulter 100 in its flat form. In particular, the bending of the first tongue 103 and second tongue 106 must be carried out in such a way that, once the occulting portion 101 and central portion 102 have been put into their three-dimensional form, the two tongues 103 and 106 are able to move towards each other as shown in FIG. 3. The bending operation on the first tongue 103 consists of bending it back on itself in a first direction 300, and the bending of the second tongue 106 consists of bending it back on itself in a second direction 301, so as to bring the locking key 113 into immediate proximity with the locking slot 109.

The form of the occulter 100 shown in FIG. 2 corresponds to the three-dimensional form which it has to adopt in order to be put into a position in which it is ready to be fixed on a reflector. One such reflector is shown in FIGS. 4 to 11. It comprises essentially an inner face 700 which can be seen in FIG. 7, and an outer face 400 which is partially visible especially in FIG. 6. The inner face 700 consists essentially of a reflective surface or mirror, the function of which is to reflect light signals produced by a light source, not shown, so as to produce the required beam.

The reflector shown is of curved form; its inner face 700 is concave; it has a body in which is formed an aperture 401 which is used, in particular, for the fitting of the occulting element 100 and the light source in place, and for the electrical power supply to the latter. In the example shown, the aperture 401 is of circular form, completed by a slot, the said slot being at least partially overlaid by a housing 402 which is adapted to receive and hold the occulter 100. In the example shown, the housing 402 comprises a first side wall 403 and a second side wall 404, the height of which is oriented parallel to the optical axis of the headlight apparatus, the optical axis being the main direction of the illumination generated by the apparatus under consideration. Each of the walls 403 and 404 includes a main portion, with these main portions extending parallel to each other towards the circular part of the aperture 401, and each main portion being completed, in the region of that one of its ends which is closest to the said circular portion, by a complementary portion which defines a return element at right angles to the main portion with which it is associated.

The two walls 403 and 404 are thus symmetrical with each other about a plane which includes the optical axis of the headlight apparatus. They do not however meet, because a space is retained between the two complementary portions. The first wall 403 and second wall 404 are completed by a first floor element 405 and a second floor element 406 respectively, which partly obstruct the slot of the aperture 401, but which leave between them an aperture 407 which is used for the purpose of allowing the central portion 102 of the occulter 100 to pass. The floor elements 405 and 406, which constitute a lower portion of the housing 402, define in particular a lower face 408, which is visible in FIG. 5 and which prolongs the inner face 700 of the reflector in the sense that the lower face 408 is visible when the reflector is viewed from the front.

Preferably, the walls and floor elements that constitute the housing 402 are formed entirely in the outer face 400 of the reflector. Thus, no operation for fastening the housing 402 on the reflector is needed. The housing 402 is thus formed during stripping of the reflector from the mould, in a material identical to that of which the reflector is made, which is for example a thermosetting material. Orientation of the elements of the housing 402 is such that the presence of the latter does not complicate manufacture of the mould; in particular, it is not necessary to introduce pullouts into the mould used.

Figure 6:
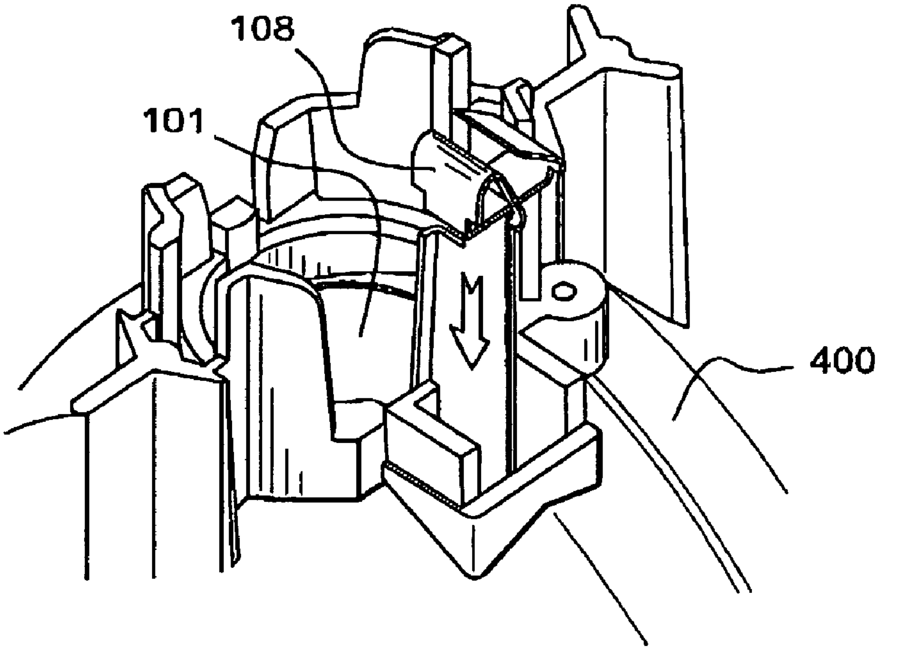
FIG. 6 is a diagrammatic representation showing a first possible way to position the occulting element shown in FIGS. 1 to 3 in the housing of FIGS. 4 and 5.
Figure 7:
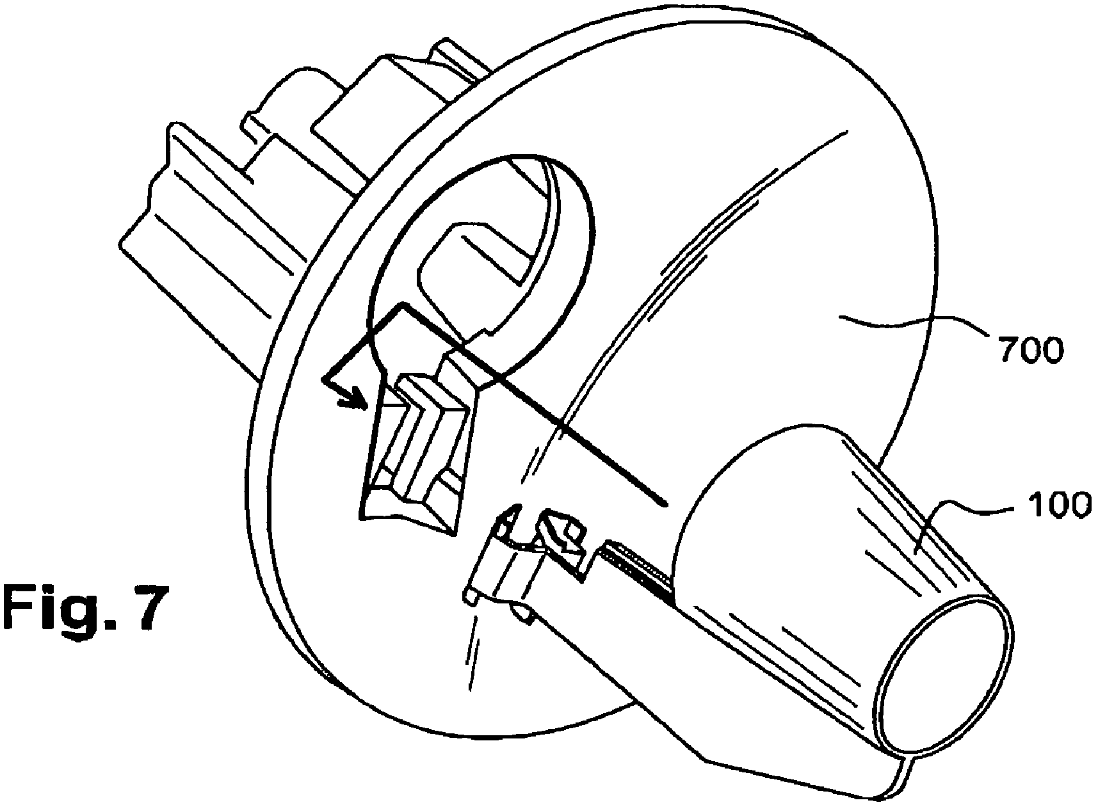
FIG. 7 is a diagrammatic representation showing a second possible way to position the occulting element shown in FIGS. 1 to 3 in the housing of FIGS. 4 and 5.
Figure 8:
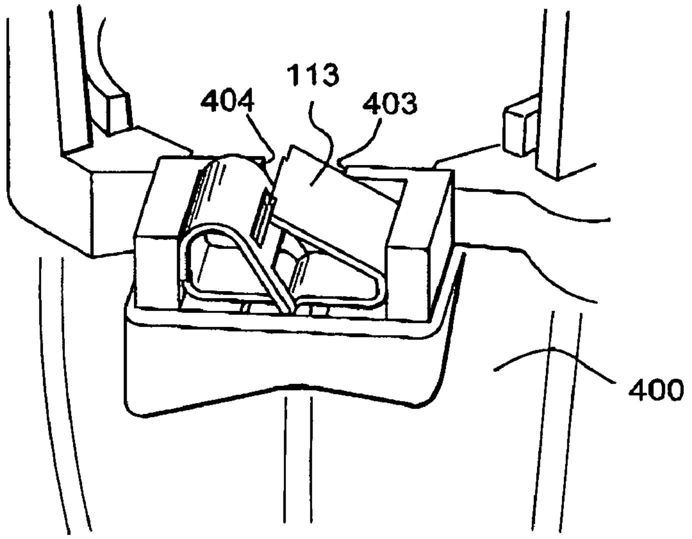
FIG. 8 is a diagrammatic representation of the occulting element shown in FIGS. 1 to 3, when it is ready to be restrained in the housing of FIGS. 4 and 5.

FIGS. 6 and 7 illustrate the fact that the occulter 100 may be brought in two different ways into the position shown in FIG. 8, which corresponds to the occulter 100, formed by bending as shown in FIGS. 2 and 3 and placed in the housing 402 before an operation of locking the retaining foot 108. The first method of doing this is shown in FIG. 7, and consists in passing the occulter 100 through the interior of the reflector. In this case, it is the retaining foot 108 that passes through the aperture 401. The second method is shown in FIG. 6 and consists in passing the occulter 100 through the outside of the reflector. In this case it is the occulting portion 101 that passes through the aperture 401. This selection of assembly method is made possible due in particular to the absence of the fastening crown for holding the occulter 100 in place.

Once the occulter 100 has been brought into the housing 402, then, in the example shown, a locking operation takes place. In other examples according to the invention, dimensions are given to the retaining foot and to the positioning of the walls of the housing 402 which are perfectly matched, so that introduction of the occulter—the retaining foot of which is less complex than that shown in the Figures and described above—into the housing 401 by force is sufficient to guarantee an adequate mechanical pressure between the said walls and the retaining foot, thereby immobilizing the occulter 100.

Figure 9:
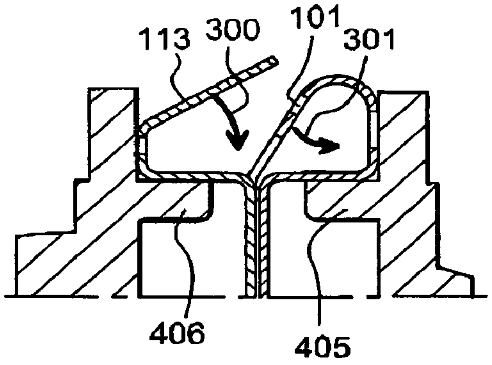
FIG. 9 is a diagrammatic illustration of a first step in one example of the practical application of the fastening method according to the invention.
Figure 10:
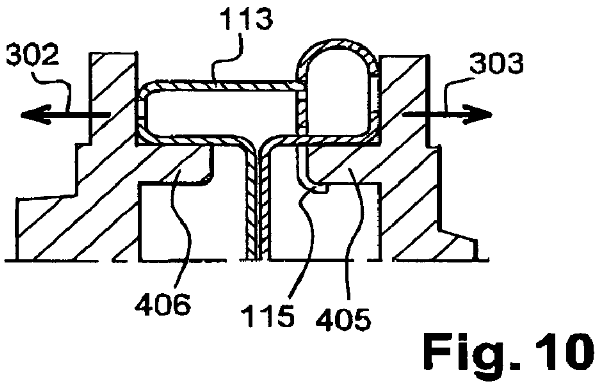
FIG. 10 is a first view of the occulting element shown in FIGS. 1 to 3, fixed on a reflector.
Figure 11:
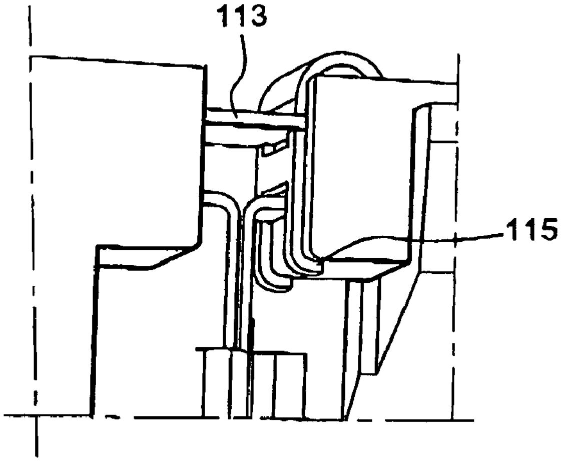
FIG. 11 is a second view of the occulting element shown in FIGS. 1 to 3, fixed on a reflector.

The locking operation is illustrated in FIGS. 9 to 11. It consists in continuing the bending movement 300 of the first tongue 103 so as to introduce the nose 110 of the locking key 113 into the locking slot 109 of the second tongue 106. Once this introduction has taken place, a force exerted on the locking key 113 will cause the bending movement 301 of the second tongue 106 to be continued until the base portion 114, situated at the end of the second tongue 106, that is to say the end from which the fastening lugs 111 and 112 project, comes into abutment against the opposite end of the second tongue 106. The said opposed end constitutes a flat zone which lies at least partly on the walls 403 and 404. It is preferably arranged that this coming into abutment corresponds to a horizontal position of the locking key 113. In this way, a point of maximum compression of the retaining foot 108 is obtained, its deformation being then at its maximum. This deformation guarantees adequate mechanical pressure between the walls of the housing 402 and the retaining foot 108, to immobilize the occulter 100 and to restrain it to a sufficient extent so that it does not shift if vibration takes place. Lateral restraint, that is to say restraint in the directions contained in a plane at right angles to the optical axis, of the occulter 100 is thus obtained. The lateral restraint is illustrated by the arrows 302 and 303 that can be seen in FIG. 10.

Continuation of the bending movement 301 on the second tongue 106 until the base portion 114 comes into abutment against the end, on the same side as the flank 105, of the second tongue 106, causes the bent-over Ends 115 of the fastening lugs 111 and 112 to pass at the same time under the floor elements 405 and 406 of the housing 402. The bent-over end portions 115 are thus brought into engagement on the lower face 408 of the floor elements 405 and 406, thereby ensuring axial restraint, that is to say restraint of the occulter 100 parallel to the optical axis.

What is claimed is:

1. A headlight apparatus for a motor vehicle, comprising:

(a) a light source;

(b) a reflector element within which the light source is disposed, the reflector comprising a concave inner face having a first aperture; and (c) an occulting element that comprises an occulting portion located within the reflector for intercepting light signals emitted by the light source, a central portion and a retaining foot, the retaining foot being held, in a housing formed on an outer face of the reflector at the level of the first aperture, by mechanical pressure exerted between walls of the housing and the retaining foot, wherein the retaining foot of the occulting element comprises a first tongue which is used as a locking key, and a second foot which includes, a locking slot for receiving the locking key.

2. The headlight apparatus according to claim 1, wherein the occulting element is a component made in one piece.

3. The headlight apparatus according to claim 1, wherein the first aperture comprises a circular portion and a slot portion, the housing being formed facing the slot portion of the first aperture.

4. The headlight apparatus according to claim 1, wherein the housing comprises a lower portion having a second aperture through which the central portion of the occulting element extends.

5. The headlight apparatus according to claim 4, wherein the second tongue comprises at least one fastening lug, each fastening lug being bent back on a lower face of the housing, which prolongs the inner face of the reflector, whereby to secure the occulting element against axial movement on the reflector.

6. The headlight apparatus according to claim 5, wherein the second fastening tongue comprises a first fastening lug and a second fastening lug.

7. The headlight apparatus according to claim 6, wherein the first fastening lug and second fastening lug are disposed on either side of the central portion of the occulting element, the first fastening lug and second fastening lug meeting together at the level of a base portion of the second fastening tongue, which is placed in abutment against a flat portion of the second tongue whereby to maintain the locking key in a horizontal position.

8. The headlight apparatus according to claim 1, wherein the occulting element is made from a material comprising layers of aluminum and milled steel laminated together.

9. The headlight apparatus according to claim 1, wherein the central portion of the occulting element comprises a first flank and a second flank, at least one of the flanks having a return portion for stiffening the central portion.

10. The headlight apparatus according to claim 9, wherein the first flank and second flank are secured together by fastening means.

11. A motor vehicle equipped with headlight apparatus according to claim 1.

12. A method of fastening an occulting element on a headlight apparatus, the headlight apparatus comprising a light source and a reflector element comprising a concave inner face having a first aperture, comprising the of:

(a) forming, on an outer face of the reflector at the level of the first aperture, a housing for receiving the occulting element;

(b) installing the occulting element within the headlight apparatus, the occulting element comprising an occulting portion, a central portion and a retaining foot having a first tongue defining a locking key and a second tongue defining a locking slot; and (c) inserting the locking key into the locking slot, so as to cause the retaining foot to spread laterally and provide mechanical pressure between walls of the housing and the retaining foot to prevent movement of the occulting element.

13. A method according to claim 12, which includes the step, in the course of the step of inserting the locking key into the locking slot, of bending back at least one fastening lug situated at one end of the second tongue, on a lower face of the housing which extends in length an inner face of the reflector, whereby to prevent axial movement of the occulting element.

14. A method according to claim 12, which includes, before the step of installing the occulting element within the headlight apparatus, the step of positioning the retaining foot in facing relationship with the housing, by passing the retaining foot through the first aperture formed in the body of the reflector.

15. A method according to claim 12, which includes, before the step of installing the occulting element in the headlight apparatus, the step of positioning the retaining foot in facing relationship with the housing by passing the occulting portion through the first aperture formed in the body of the reflector.

* * * * *